US009126855B2

(12) United States Patent
Weist et al.

(10) Patent No.: US 9,126,855 B2
(45) Date of Patent: Sep. 8, 2015

(54) METHODS FOR USING OZONE TO ENHANCE ANAEROBIC DIGESTION

(75) Inventors: Annemarie Ott Weist, Macungie, PA (US); Vipul P. Dholakia, Macungie, PA (US); Neil Hannay, Yeovil (GB)

(73) Assignee: Air Products and Chemicals, Inc., Allentown, PA (US)

(*) Notice: Subject to any disclaimer, the term of this patent is extended or adjusted under 35 U.S.C. 154(b) by 560 days.

(21) Appl. No.: 13/523,083

(22) Filed: Jun. 14, 2012

(65) Prior Publication Data

US 2013/0334133 A1 Dec. 19, 2013

(51) Int. Cl.
 C02F 3/28 (2006.01)
 C02F 1/78 (2006.01)

(52) U.S. Cl.
 CPC ...... *C02F 1/78* (2013.01); *C02F 3/28* (2013.01); Y02E 50/343 (2013.01)

(58) Field of Classification Search
 CPC ............ C02F 1/78; C02F 3/28; Y02E 50/343
 USPC .................................................. 210/603, 631
 See application file for complete search history.

(56) References Cited

U.S. PATENT DOCUMENTS

| 5,810,910 A | 9/1998 | Ludwig et al. |
| 5,846,298 A | 12/1998 | Weist, Jr. |
| 6,030,598 A | 2/2000 | Topham et al. |
| 6,365,048 B1* | 4/2002 | Masten et al. ............... 210/610 |
| 6,500,340 B1 | 12/2002 | Burke |
| 7,819,947 B2 | 10/2010 | Weist et al. |
| 2006/0243660 A1 | 11/2006 | Kamachi et al. |
| 2010/0187092 A1 | 7/2010 | Weist et al. |
| 2010/0189635 A1 | 7/2010 | Weist, Jr. |
| 2012/0080374 A1 | 4/2012 | Komor et al. |
| 2012/0223012 A1 | 9/2012 | Gokcay |
| 2012/0318146 A1 | 12/2012 | Moon |

FOREIGN PATENT DOCUMENTS

| JP | 06269797 | 9/1994 |
| JP | 2001025796 A | 1/2001 |
| KR | 10-1027809 | 4/2011 |
| KR | 10-2012-0058279 | 9/2014 |
| TW | 487686 B | 5/2001 |
| WO | 2004005199 A1 | 1/2004 |

OTHER PUBLICATIONS

Deshai Botheju et al, Oxygen Effects in Anaerobic Digestion—A Reiew, The Open Waste Management Journal, 2011, 4, pp. 1-19.
Alvarez, Pedro M., Integration of Ozonation and an Anaerobic Sequencing Batch Rector (AnSBR) for the Treatment of Cherry Stillage, Biotechnology Progress, 2005, pp. 1543-1551, vol. 21.

(Continued)

*Primary Examiner* — Fred Prince
(74) *Attorney, Agent, or Firm* — Amy Carr-Trexler

(57) ABSTRACT

The invention discloses systems and methods for producing a gas stream containing ozone and a "carrier" or sweep gas that has an oxygen concentration that is below a predetermined percentage for treatment of organic waste feed stocks in an anaerobic digester. In one embodiment, ozone and unreacted oxygen from an ozone generator are delivered to a pressure swing adsorption cycle, wherein the ozone is adsorbed onto a sieve and the excess oxygen is removed from the cycle. The sweep gas, which has a limited oxygen concentration, is then used to desorb the ozone from the pressure swing adsorption cycle and deliver the ozone to an anaerobic digester, where the ozone is used to treat the feed stock.

20 Claims, 3 Drawing Sheets

(56) References Cited

OTHER PUBLICATIONS

Komatsu, K., Feasible Power Production from Municipal Sludge Using an Improved Anaerobic Digestion System, Ozone: Science & Engineering, Mar.-Apr. 2011, pp. 164-170, vol. 33.

Siles, J. A., Integrated Ozonation and Biomethanization Treatments Of Vinasse Derived from Ethanol Manufacturing, Journal of Hazardous Materials, 2011, pp. 247-253, vol. 188.

M. Weemaes, et al, Anerobic Digestion of Ozonized Biosolids, Wat. Res. vol. 34, No. 8, 2000, pp. 2330-2336.

* cited by examiner

METHODS FOR USING OZONE TO ENHANCE ANAEROBIC DIGESTION

BACKGROUND OF THE INVENTION

Ozone ($O_3$) is a powerful disinfectant with many industrial and commercial applications. For example, ozone is used to oxidize organic contaminants from drinking water, including the naturally occurring taste- and odor-causing compounds. Ozone is also used in the effluent from the secondary treatment of wastewater to remove trace organic contaminants and endocrine disrupting compounds (EDCs) from the water before reuse as indirect potable water or discharge to a water body.

Ozone gas ($O_3$) is commonly produced in a corona discharge-based generator from air or high-purity oxygen ($O_2$). For larger ozone needs, oxygen is generally the less expensive option for a source gas. The conversion of oxygen into ozone in commercial corona discharge generators is typically between 3 and 14%, and in certain applications the resulting oxygen-ozone mixture is provided as a product directly to the downstream user without further treatment.

It has been found that ozone may also be used to enhance anaerobic digestion by converting difficult to biodegrade compounds into more easily biodegradable compounds. Ozone may be used in this way to enhance biogas production from anaerobic digestion. For anaerobic digestion of sludge, it is theorized that the ozone lyses the cell membranes, thereby exposing the more easily biodegradable cytoplasm of the bacteria. Fermentation waste, often called vinasse, can contain compounds such as phenols that are toxic to the anaerobic bacteria and other larger carbon-based compounds that are recalcitrant. Pretreating this feed with ozone will reduce or eliminate the toxic compounds and make the larger compounds more biodegradable, thereby reducing the required residence time in the digester. In an anaerobic digestion process, it is undesirable to have excess oxygen present because the oxygen reduces the methane ($CH_4$) yield by promoting aerobic digestion.

Accordingly, there is a need for an improved method of recovering unreacted oxygen from an ozone-generation process so that the effluent may be efficiently used for an anaerobic digestion process, while maintaining high efficiency in the ozone-generation system.

BRIEF SUMMARY OF THE INVENTION

In one respect, the invention is a method comprising: (a) generating a first gas stream comprising at least 4% ozone by weight and at least 50% oxygen by weight; (b) separating at least a portion of the ozone from the first gas stream; (c) forming a second gas stream comprising at least a portion of the ozone that was separated from the first gas stream in step (b), the second gas stream having no more than 18% oxygen by weight; (d) treating wastewater using an anaerobic digestion process; and (e) contacting the second gas stream with at least a portion of the wastewater either before the wastewater is treated using the anaerobic digestion process or while the wastewater is treated using the anaerobic digestion process.

In another respect, the invention is a method for treating wastewater with ozone, the method comprising: (a) generating a first gas stream comprising at least 4% ozone by weight and at least 50% oxygen by weight; (b) transferring at least a portion of the ozone from the first gas stream to a second gas stream using a pressure swing adsorption cycle, the second gas stream comprising no more than 18% oxygen by weight; and (c) bringing the second gas stream in contact with the wastewater either upstream from an anaerobic digester or within the anaerobic digester.

In yet another respect, the invention is a system for treating wastewater with ozone, the system comprising: an ozone generator that is operationally configured to generate a first gas stream from a source of oxygen, the first gas stream comprising at least 4% ozone by weight and at least 50% oxygen by weight; a pressure swing adsorption system that is operationally configured to (1) receive the first gas stream and to transfer at least a portion of the ozone from the first gas stream to a second gas stream, (2) discharge the second gas stream, and (3) discharge a third gas stream, the second gas stream comprising no more than 18% oxygen by weight, the third gas stream comprising gas remaining from the first gas stream after the at least a portion of the ozone is transferred to the second gas stream, the third gas stream comprising at least 50% oxygen by weight; and a first interface that is operationally configured to bring the second gas stream in contact with wastewater either within an anaerobic digester or within a first vessel that is in fluid flow communication with the anaerobic digester.

The following represent further aspects of the invention.

Aspect 1. A method comprising:
(a) generating a first gas stream comprising at least 4% ozone by weight and at least 50% oxygen by weight;
(b) separating at least a portion of the ozone from the first gas stream;
(c) forming a second gas stream comprising at least a portion of the ozone that was separated from the first gas stream in step (b), the second gas stream having no more than 18% oxygen by weight;
(d) treating wastewater using an anaerobic digestion process; and
(e) contacting the second gas stream with at least a portion of the wastewater either before the wastewater is treated using the anaerobic digestion process or while the wastewater is treated using the anaerobic digestion process.

Aspect 2. The method of any of Aspects 1 and 3-9, wherein steps (b) and (c) comprise steps of a pressure swing adsorption cycle.

Aspect 3. The method of any of Aspects 1, 2, and 4-9, wherein step (c) comprises forming a second gas stream comprising a sweep gas and at least a portion of the ozone that was separated from the first gas stream in step (b), the second gas stream having no more than 18% oxygen by weight and the sweep gas comprising at least 90% nitrogen by volume.

Aspect 4. The method of any of Aspects 1-3 and 5-9, wherein step (c) comprises forming a second gas stream comprising a sweep gas and at least a portion of the ozone that was separated from the first gas stream in step (b), the second gas stream having no more than 18% oxygen by weight and the sweep gas consisting essentially of a mixture of carbon dioxide and nitrogen.

Aspect 5. The method of any of Aspects 1-4 and 6-9, further comprising:
(f) separating a third gas stream from the first gas stream, the third gas stream comprising at least 80% oxygen; and
(g) delivering the third gas stream to an aerobic digester.

Aspect 6. The method of any of Aspects 1-5 and 7-9, further comprising:
(h) separating a third gas stream from the first gas stream, the third gas stream comprising at least 80% oxygen; and
(i) using the third gas stream as at least a portion of a supply gas stream for an ozone generator used to perform step (a).

Aspect 7. The method of any of Aspects 1-6, 8, and 9, wherein the performance of step (e) begins in a digester pretreatment chamber located upstream from and in fluid flow communication with an anaerobic digester in which step (d) is performed.

Aspect 8. The method of any of Aspects 1-7 and 9, further comprising:

(j) enabling a gas-phase effluent to flow from an anaerobic digester to a biogas separator;

(k) separating carbon dioxide contained in the gas-phase effluent from biogas; and (l) reusing in step (c) the carbon dioxide separated during step (k).

Aspect 9. The method of any of Aspects 3-8, further comprising:

(m) cooling at least a portion of biogas from an anaerobic digester using liquid nitrogen, which results in at least some of the liquid nitrogen becoming nitrogen vapor; and (n) using the nitrogen vapor as at least a portion of the sweep gas.

Aspect 10. A method for treating wastewater with ozone, the method comprising:

(a) generating a first gas stream comprising at least 4% ozone by weight and at least 50% oxygen by weight;

(b) transferring at least a portion of the ozone from the first gas stream to a second gas stream using a pressure swing adsorption cycle, the second gas stream comprising no more than 18% oxygen by weight; and (c) bringing the second gas stream into contact with wastewater either upstream from an anaerobic digester or within an anaerobic digester.

Aspect 11. The method of any of Aspects 10, 12, and 13, wherein step (c) at least partially occurs in a digester pretreatment chamber that is in fluid flow communication with the anaerobic digester and the pressure swing adsorption cycle, the digester pretreatment chamber being downstream from the pressure swing adsorption cycle.

Aspect 12. The method of any of Aspects 10, 11, and 13, further comprising:

(d) enabling a gas-phase effluent stream to flow from the anaerobic digester to a biogas separator;

(e) separating the biogas into a first component stream comprising carbon dioxide and a second component stream comprising methane; and (f) reusing the first component stream as the second gas stream of step (b).

Aspect 13. The method of any of Aspects 10-12, further comprising:

(g) enabling a gas-phase effluent stream to flow from the anaerobic digester to a biogas separator;

(h) separating the biogas into a first component stream comprising carbon dioxide and a second component stream comprising methane;

(i) cooling the second component stream using liquid nitrogen, which results in at least some of the liquid nitrogen becoming nitrogen vapor; and (j) using at least one of the first component stream and the nitrogen vapor as the second gas stream of step (b).

Aspect 14. A system for treating wastewater with ozone, the system comprising:

an ozone generator that is operationally configured to generate a first gas stream from a source of oxygen, the first gas stream comprising at least 4% ozone by weight and at least 50% oxygen by weight;

a pressure swing adsorption system that is operationally configured to receive the first gas stream and to transfer at least a portion of the ozone from the first gas stream to a second gas stream, to discharge the second gas stream, and to discharge a third gas stream, the second gas stream comprising no more than 18% oxygen by weight, the third gas stream comprising gas remaining from the first gas stream after the at least a portion of the ozone is transferred to the second gas stream, the third gas stream comprising at least 50% oxygen by weight; and a first interface that is operationally configured to bring the second gas stream into contact with wastewater either within an anaerobic digester or within a first vessel that is in fluid flow communication with an anaerobic digester.

Aspect 15. The system of any of Aspects 14 and 16-20, wherein the pressure swing adsorption system comprises a sieve, the pressure swing adsorption system being operationally configured to adsorb the at least a portion of the ozone onto the sieve, then to desorb at least a portion of the adsorbed ozone using a sweep gas, the second gas stream comprising the desorbed ozone and the sweep gas.

Aspect 16. The system of any of Aspects 14, 15, and 17-20, wherein the sweep gas comprises at least 90% nitrogen by volume.

Aspect 17. The system of any of Aspects 14-16 and 18-20, further comprising an aerobic digester and a second interface that is operationally configured to bring the third gas stream in contact with the wastewater either within the aerobic digester or within a second vessel that is in fluid flow communication with the aerobic digester.

Aspect 18. The system of any of Aspects 14-17, 19, and 20, further comprising an output line in fluid flow communication with the pressure swing adsorption system and the ozone generator, the output line being operationally configured to return the third gas stream to the ozone generator.

Aspect 19. The system of any of Aspects 14-18 and 20, further comprising a biogas separator in fluid flow communication with the anaerobic digester, the biogas separator being operationally configured to separate the biogas into a first component stream comprising carbon dioxide and a second component stream comprising methane, and wherein the sweep gas comprises the first component stream.

Aspect 20. The system of any of Aspects 14-19, further comprising a heat exchanger that is operationally configured to cool the second component stream using liquid nitrogen and a third vessel that is operationally configured to receive nitrogen vapor from the heat exchanger, wherein the sweep gas comprises the nitrogen vapor.

DETAILED DESCRIPTION OF THE EMBODIMENTS OF THE INVENTION

Figure 1:
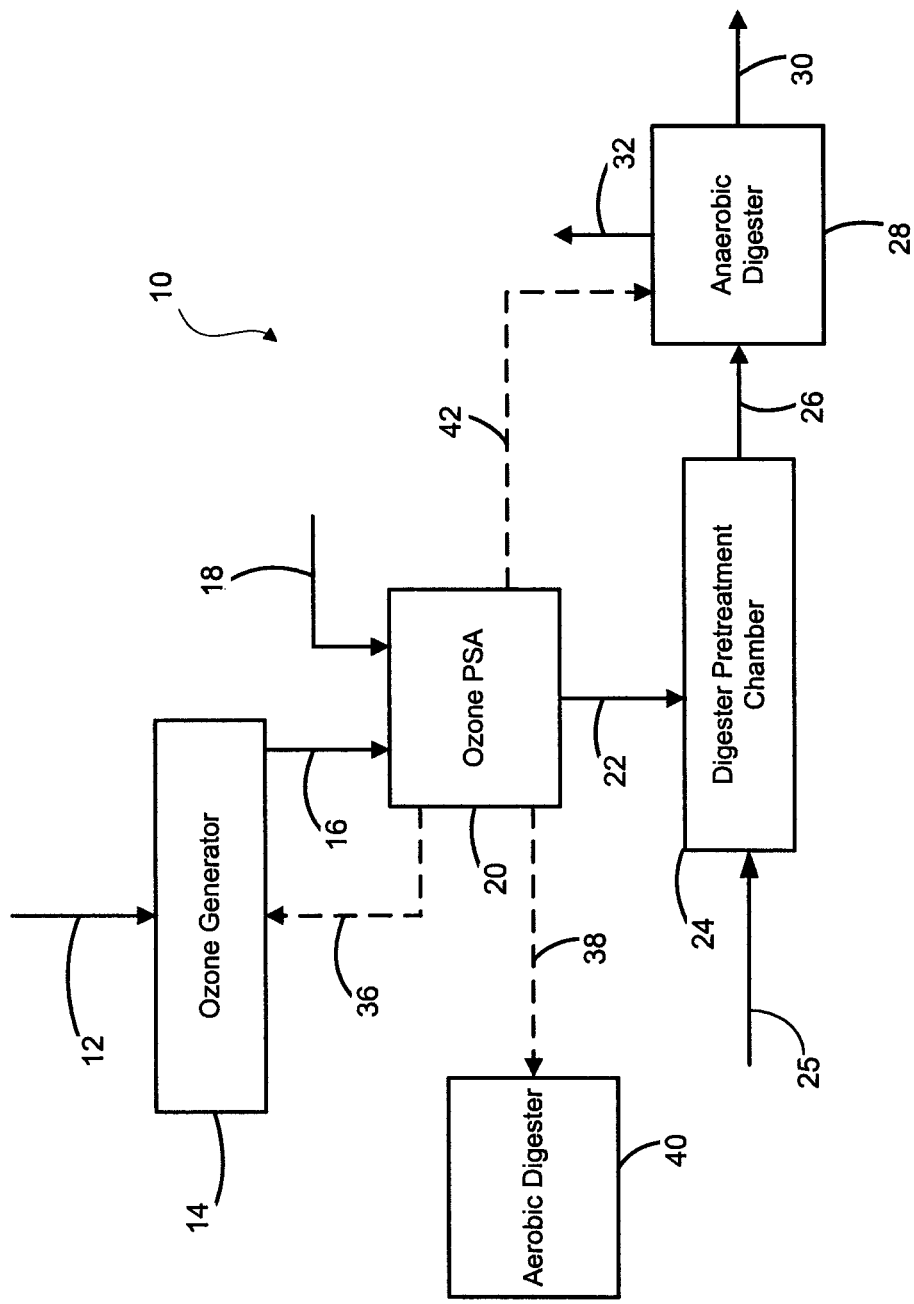
FIG. 1 is a schematic diagram of a first exemplary embodiment of the present invention.

Unless otherwise stated herein, any and all percentages identified in the specification, drawings and claims should be understood to be on a weight percentage basis.

To aid in describing the invention, directional terms may be used in the specification and claims to describe portions of the present invention (e.g., upper, lower, left, right, etc.). These directional terms are merely intended to assist in describing and claiming the invention and are not intended to limit the invention in any way.

In the claims, letters are used to identify claimed steps (e.g., (a), (b), and (c)). These letters are used to aid in referring to the method steps and are not intended to indicate the order in which claimed steps are performed, unless and only to the extent that such order is specifically recited in the claims.

The methods according to the present invention provide an efficient manner in which to recover unreacted oxygen from an ozone-generation process so that the effluent may be efficiently delivered to an anaerobic digestion process, while maintaining high efficiency in the ozone-generation system.

Anaerobic digestion involves a series of processes in which microorganisms break down biodegradable material in the relative absence of oxygen. The digestion process begins with bacterial hydrolysis of the feed material in order to break down insoluble organic polymers such as carbohydrates and make them available for reaction with other bacteria. Acidogenic bacteria then convert the sugars and amino acids into carbon dioxide, hydrogen, ammonia, and organic acids. Acetogenic bacteria then convert the resulting organic acids into acetic acid, along with additional ammonia, hydrogen, and carbon dioxide. Finally, methanogens convert these products into methane and carbon dioxide (the primary components of biogas). The produced digestate can be further separated into a nutrient-rich fertilizer and a wastewater stream. The wastewater stream is further treated, typically via aerobic digestion, before being discharged or possibly reused.

Anaerobic digestion is widely used as a source of renewable energy. The process produces biogas, which as noted above primarily comprises methane and carbon dioxide. This biogas can be used directly as cooking fuel, in combined heat and power gas engines, or upgraded to natural gas-quality biomethane. The utilization of biogas as a fuel source helps reduce reliance on fossil fuels.

Many organic materials can be processed via anaerobic digestion. However, some organic waste is recalcitrant in nature and is difficult for the bacteria in the anaerobic digester to digest. For example, polyphenols are an organic byproduct of the fermentation process, but are not biodegradable. Left untreated by the anaerobic digestion, this type of waste is typically removed with the digestate and therefore never converted into biogas. Other types of organic waste may be toxic to the bacteria located in the anaerobic digester and therefore, if not pretreated, this waste would make the digester process difficult to control. Preozonation of these feed stocks has been shown to break up the polyphenols and other recalcitrant molecules into smaller organic molecules that are more easily biodegradable. In addition, ozone can react with compounds that are toxic to the digestion bacteria in order to render these compounds non-toxic to the bacteria.

Ozone gas is commonly produced in a corona discharge-based generator from air or high-purity oxygen. The typical concentration of ozone in gas phase that is produced ranges from 3-14%, depending on the generator power and the concentration of oxygen that is used in the gas feed for ozone generation. The total cost of producing ozone is generally calculated as the sum of the power costs to operate the corona discharge generator and the cost of oxygen (or compressed air) that is used for the gas feed. For a given ozone production rate, the power required to operate an air-fed system is much greater than the power required to operate a high-purity oxygen-fed system. Typically, for larger systems that require high ozone generation, oxygen is the more economical choice for the feed gas.

On the other hand, for feed stock that is entering an anaerobic digester or ozone pretreatment chamber, it is desirable that excess oxygen not be introduced because the oxygen will lower the quality of the generated biogas by promoting aerobic digestion and $CO_2$ production. In addition, excess oxygen accumulation in the biogas can be a potential safety hazard if a gas mixture that contains methane, inert gases, and oxygen falls between the lower and upper flammibility limits.

The inventions described herein are systems and methods for producing a gas stream containing ozone and a "carrier" gas that has a limited oxygen content for treatment of organic waste feed stocks. In some embodiments, the maximum oxygen content in the carrier gas may be, for example, 18% by weight. With reference to FIG. 1, a first exemplary embodiment of the present invention will now be described. FIG. 1 shows a schematic diagram of an exemplary system 10. Initially, a high-purity oxygen stream 12 enters an ozone generator 14, where a portion (typically 3-14% by weight) of the oxygen is converted into ozone. The high-purity oxygen stream may, for example, be comprised of at least 95% oxygen by weight if it is a liquid oxygen source or at least 90% oxygen by weight if it is a vacuum swing adsorption source. The effluent stream 16, which comprises ozone and the unreacted oxygen, then exits the ozone generator 14 and is delivered to a pressure swing adsorption ("PSA") system 20. In some embodiments, the effluent stream 16 comprises at least 4% ozone by weight and at least 50% oxygen by weight. The PSA system 20 is used to recover the unreacted oxygen from the effluent stream 16 and, as described below, to provide a carrier gas with a sufficiently low percentage of oxygen to transport ozone to an anaerobic digester 28. In alternate embodiments, the generated ozone may be separated from the oxygen stream through the use of a system having an ozone-permeable membrane.

In a typical PSA cycle, the ozone is selectively adsorbed from the ozone generator outlet stream (e.g., effluent stream 16) onto a sieve in an adsorption bed, and then desorbed from the sieve using a sweep gas after the unreacted oxygen gas has been collected and removed from the PSA cycle. Within the scope of the present invention, it is possible to either compress and deliver the recovered ozone-depleted oxygen back to the ozone generator 14 via recycle stream 36, or instead to deliver the recovered ozone-depleted oxygen to an aerobic digester 40—which is located on the same site—via output stream 38. In alternate embodiments, a portion of the ozone-depleted oxygen that is collected from the PSA cycle may be routed directly to an aerobic digester, and the remainder of the oxygen may be compressed and delivered back to the ozone generator. In some embodiments, the gas stream that includes the unreacted oxygen comprises at least 50%, and more preferably at least 80%, oxygen by weight. Referring back to the embodiment of FIG. 1, once the unreacted oxygen has been removed from the PSA system 20, the ozone that has been adsorbed in the adsorption bed is then desorbed by a sweep gas 18. Because it is desirable to limit the amount of oxygen that is delivered to the anaerobic digester, the sweep gas 18 should have less than a predetermined percentage of oxygen. The sweep gas 18 may comprise, for example, air, nitrogen, $CO_2$, or a mixture thereof. In some alternate embodiments, the oxygen content in air may be too high to be suitable for use as a sweep gas that enters directly into an anaerobic digester. In these embodiments, the predetermined percentage of oxygen in the sweep gas 18 may be no more than 18%.

Figure 3:
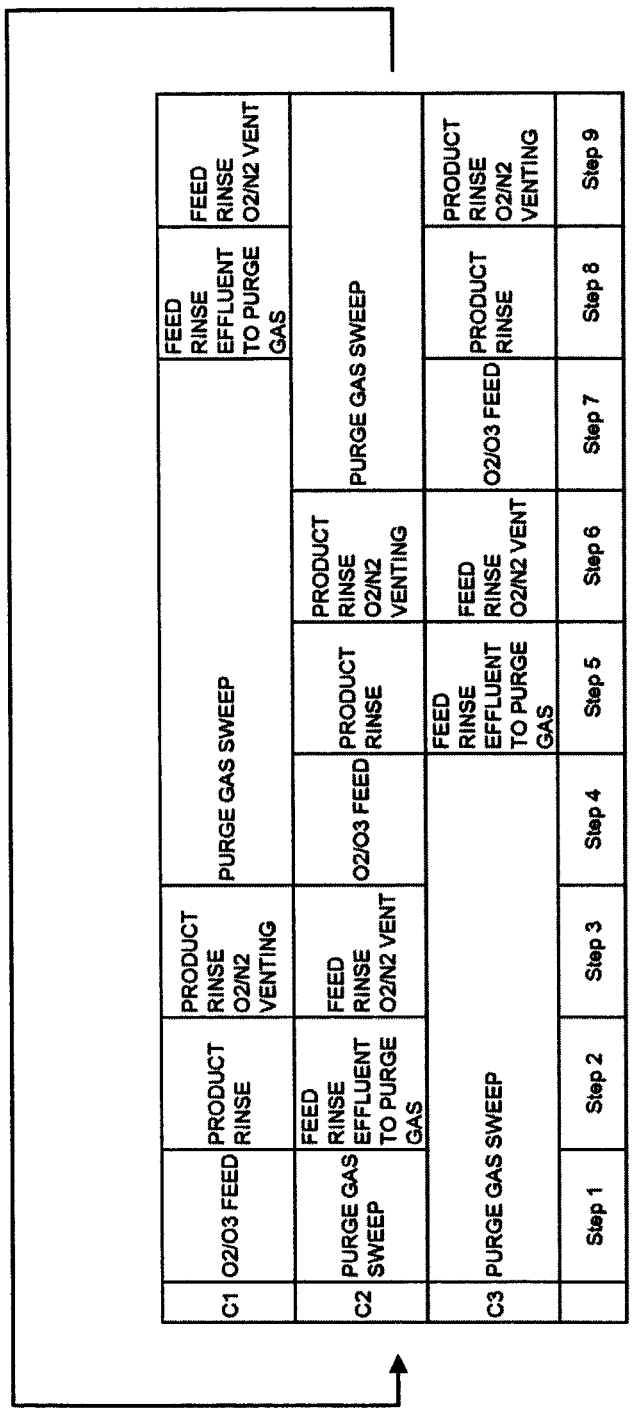
FIG. 3 is a chart showing a suitable exemplary PSA cycle for use with the ozone PSA system.

Referring back to the embodiment of FIG. 1, the combined sweep gas 18 and desorbed ozone then exit the PSA system 20 via effluent stream 22. PSA cycles and systems are well known in the relevant art. One example of a suitable PSA cycle and system is taught in U.S. Patent Application Publication No. U.S.2010/0189635A1, entitled Pressure Swing Adsorption Cycle for Ozone Production, the entire contents of which are incorporated herein by reference as if fully set forth. One having ordinary skill in the art will appreciate that the systems and methods for operating a PSA cycle that are taught in the above-noted reference are fully applicable, mutatis mutandis, to the embodiments of the present application. FIG. 3 also shows a suitable exemplary PSA cycle for use with the PSA ozone systems and methods according to the present invention.

In some embodiments, before the effluent stream 22 is delivered downstream from the PSA system 20, it may be desirable to vent off an initial portion of the effluent stream 22 because oxygen that has not been removed from the PSA system 20 may be present in a concentration that is higher than the desired concentration in the initial portion of the effluent stream 22.

Referring still to the embodiment of FIG. 1, in some configurations the effluent stream 22 containing the ozone and sweep gas may be directed into a digester pretreatment chamber 24 that is in fluid flow communication with and located downstream from the PSA system 20. In the digester pretreatment chamber 24, the ozone is used to pretreat (preozonate) the feed stock (wastewater) provided in stream 25 that is to be treated. In other words, the ozone in the effluent stream 22 is allowed to contact the wastewater in the digester pretreatment chamber 24. The digester pretreatment chamber 24 is in fluid flow communication with the anaerobic digester 28. An effluent stream 26 that exits the digester pretreatment chamber 24 enters the anaerobic digester 28, where it continues to be placed in contact and react with the feed stock. Due to the limited presence of oxygen in the effluent stream 22 that enters the digester pretreatment chamber 24, the dissolved oxygen content of the effluent stream 26 that exits from the digester pretreatment chamber 24 is lower than it would be in a feed stream pretreated with a mixed oxygen/ozone stream. In some embodiments, the percentage of oxygen in the effluent stream 26 should be no more than 18%. In alternate embodiments, it may be preferable that the percentage of oxygen in the effluent stream 26 is substantially less than 18%.

In alternate embodiments, where a separate vessel for ozone pre-treatment may be unnecessary, it may be possible to omit a digester pretreatment chamber entirely from the system. By way of example only, direct routing of the effluent from the PSA system 20 to the anaerobic digester 28 is shown schematically in FIG. 1 as effluent stream 42. It should be understood that the effluent stream 22 is contacted with the wastewater 25 upstream from and/or in the anaerobic digester.

After the anaerobic digestion process has been completed in the anaerobic digester 28, the liquid-phase portion of the treated stock may then exit the system 10 via liquid effluent stream 30, and the gas-phase portion of the treated stock may exit the system 10 via gas effluent stream 32. The anaerobic digestion process could be used with feed stocks such as animal manure, waste sludge, or food and beverage processing waste such as stillage and vinasse. The anaerobic digester could be fed with specially-grown energy crops such as silage for dedicated biogas production.

Figure 2:
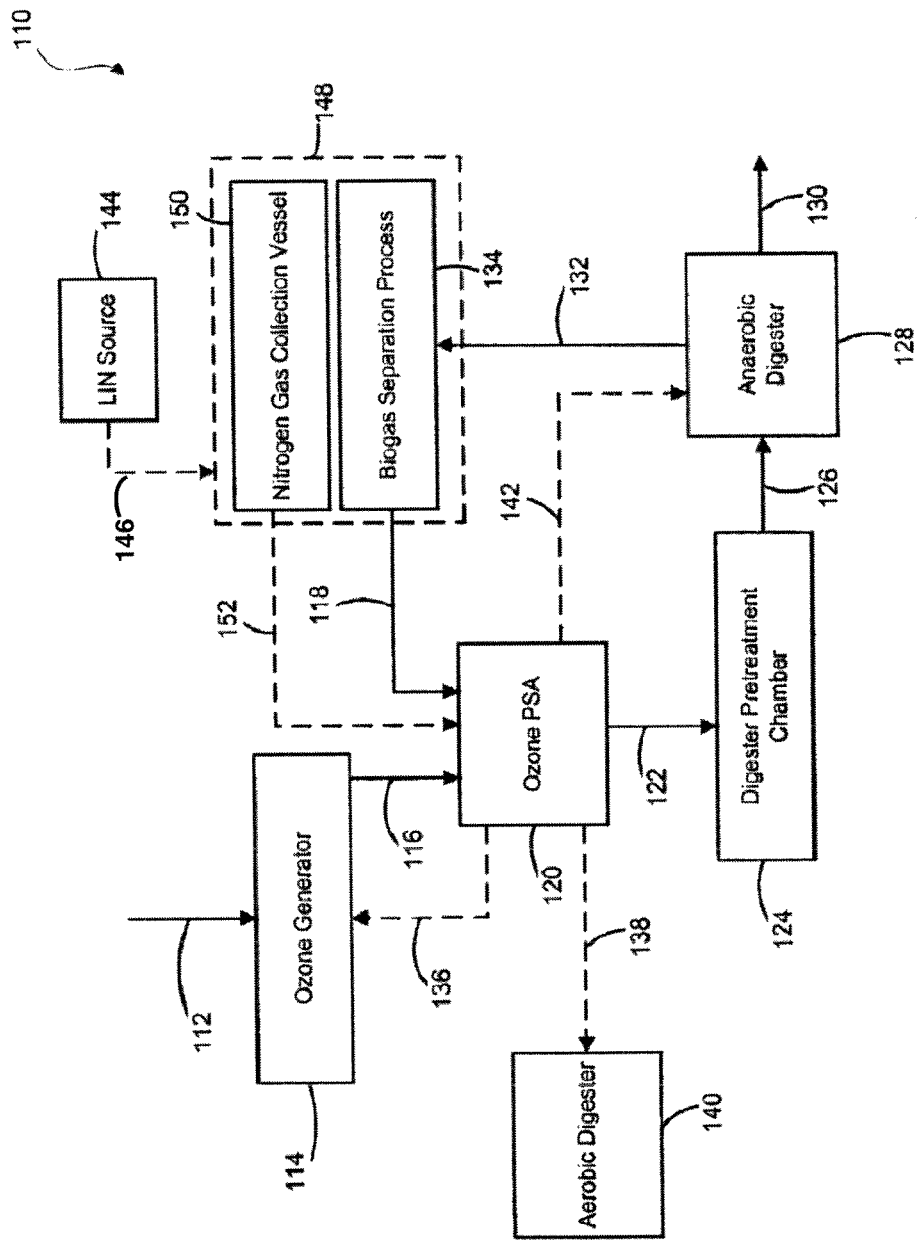
FIG. 2 is a schematic diagram of a second exemplary embodiment of the present invention.

A second embodiment of an exemplary system 110 is shown schematically in FIG. 2. In this embodiment, elements of the system 110 that are the same as elements in the first embodiment of the system 10 are given a reference numeral increased by 100. For example, the ozone generator 14 of the first embodiment of the system 10 is the same as the ozone generator 114 of the second embodiment of the system 110. In the interest of clarity, some features of this embodiment that are shared with the first embodiment are numbered in FIG. 2, but are not repeated in the specification.

In the embodiment shown in FIG. 2, the gas effluent stream 132 that exits the anaerobic digester 128 is routed to an apparatus for performing a biogas separation process 134. This process separates the biogas from the other gaseous components of the gas effluent stream 132. In this embodiment, the effluent stream 118 exiting from the biogas separation process 134 is used as the sweep gas that enters the PSA system 120 in order to desorb the ozone from the adsorption bed in the PSA system 120. In some embodiments, nitrogen may preferably be used as the sweep gas because it is relatively unreactive and may assist to control the pH of the biogas. In some embodiments, the sweep gas is comprised of at least 90% nitrogen by volume. In alternate embodiments, the sweep gas may consist essentially of a mixture of carbon dioxide and nitrogen. As described above, the nitrogen that is used to sweep the ozone gas from the PSA system 120 into the anaerobic digester 128 may be routed to the biogas separation process 134, and then delivered as the effluent stream 118 exiting the biogas separation process 134 to be reused again as a sweep gas in the PSA system 120. In some embodiments, the biogas in the biogas separation process 134 is separated into a first component stream comprising carbon dioxide and a second component stream comprising methane, and the carbon dioxide of the first component stream is used as the effluent stream 118 that exits the biogas separation process 134 to be used again as the sweep gas in the PSA system 120.

In alternate embodiments, a source of liquid nitrogen ("LIN") 144 may be delivered via line 146 and used indirectly (via a heat-exchanger 148) to cool and condense the methane in the biogas during the biogas separation process 134. This methane may comprise the methane of the second component stream mentioned above. This heat-exhange process will tend to cause some or all of the LIN to vaporize into a gas phase. In some embodiments, this converted nitrogen gas (vapor) may be collected in a vessel 150. The collected nitrogen gas may then be delivered from the vessel 150 via output line 152 to the PSA system 120, where it is used as at least a portion of the sweep gas that desorbs the the ozone from the PSA system 120 in accordance with the herein disclosed systems and methods.

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

The invention claimed is:

1. A method comprising:
   (a) generating a first gas stream comprising at least 4% ozone by weight and at least 50% oxygen by weight;
   (b) separating at least a portion of the ozone from the first gas stream;
   (c) forming a second gas stream comprising at least a portion of the ozone that was separated from the first gas stream in step (b), the second gas stream having no more than 18% oxygen by weight;
   (d) treating wastewater using an anaerobic digestion process; and
   (e) contacting the second gas stream with at least a portion of the wastewater either before the wastewater is treated using the anaerobic digestion process or while the wastewater is treated using the anaerobic digestion process.

2. The method of claim 1, wherein steps (b) and (c) comprise steps of a pressure swing adsorption cycle.

3. The method of claim 1, wherein step (c) comprises forming a second gas stream comprising a sweep gas and at least a portion of the ozone that was separated from the first gas stream in step (b), the second gas stream having no more than 18% oxygen by weight and the sweep gas comprising at least 90% nitrogen by volume.

4. The method of claim 1, wherein step (c) comprises forming a second gas stream comprising a sweep gas and at least a portion of the ozone that was separated from the first gas stream in step (b), the second gas stream having no more than 18% oxygen by weight and the sweep gas consisting essentially of a mixture of carbon dioxide and nitrogen.

5. The method of claim 1, further comprising:
(f) separating a third gas stream from the first gas stream, the third gas stream comprising at least 80% oxygen; and
(g) delivering the third gas stream to an aerobic digester.

6. The method of claim 1, further comprising:
(f) separating a third gas stream from the first gas stream, the third gas stream comprising at least 80% oxygen; and
(g) using the third gas stream as at least a portion of a supply gas stream for an ozone generator used to perform step (a).

7. The method of claim 1, wherein the performance of step (e) begins in a digester pretreatment chamber located upstream from and in fluid flow communication with an anaerobic digester in which step (d) is performed.

8. The method of claim 1, further comprising:
(f) enabling a gas-phase effluent to flow from an anaerobic digester to a biogas separator;
(g) separating carbon dioxide contained in the gas-phase effluent from biogas; and
(h) reusing in step (c) the carbon dioxide separated during step (k).

9. The method of claim 3, further comprising:
(f) cooling at least a portion of biogas from an anaerobic digester using liquid nitrogen, which results in at least some of the liquid nitrogen becoming nitrogen vapor; and
(g) using the nitrogen vapor as at least a portion of the sweep gas.

10. A method for treating wastewater with ozone, the method comprising:
(a) generating a first gas stream comprising at least 4% ozone by weight and at least 50% oxygen by weight;
(b) transferring at least a portion of the ozone from the first gas stream to a second gas stream using a pressure swing adsorption cycle, the second gas stream comprising no more than 18% oxygen by weight; and
(c) bringing the second gas stream into contact with the wastewater either upstream from an anaerobic digester or within an anaerobic digester.

11. The method of claim 10, wherein step (c) at least partially occurs in a digester pretreatment chamber that is in fluid flow communication with the anaerobic digester and the pressure swing adsorption cycle, the digester pretreatment chamber being downstream from the pressure swing adsorption cycle.

12. The method of claim 10, further comprising:
(d) enabling a gas-phase effluent stream to flow from the anaerobic digester to a biogas separator;
(e) separating the biogas into a first component stream comprising carbon dioxide and a second component stream comprising methane; and
(f) reusing the first component stream as the second gas stream of step (b).

13. The method of claim 12, further comprising:
(d) enabling a gas-phase effluent stream to flow from the anaerobic digester to a biogas separator;
(e) separating the biogas into a first component stream comprising carbon dioxide and a second component stream comprising methane;
(f) cooling the second component stream using liquid nitrogen, which results in at least some of the liquid nitrogen becoming nitrogen vapor; and
(g) using at least one of the first component stream and the nitrogen vapor as the second gas stream of step (b).

14. A system for treating wastewater with ozone, the system comprising:
an ozone generator that is operationally configured to generate a first gas stream from a source of oxygen, the first gas stream comprising at least 4% ozone by weight and at least 50% oxygen by weight;
a pressure swing adsorption system that is operationally configured to receive the first gas stream and to transfer at least a portion of the ozone from the first gas stream to a second gas stream, to discharge the second gas stream, and to discharge a third gas stream, the second gas stream comprising no more than 18% oxygen by weight, the third gas stream comprising gas remaining from the first gas stream after the at least a portion of the ozone is transferred to the second gas stream, the third gas stream comprising at least 50% oxygen by weight; and
a first interface that is operationally configured to bring the second gas stream into contact with wastewater either within an anaerobic digester or within a first vessel that is in fluid flow communication with an anaerobic digester.

15. The system of claim 14, wherein the pressure swing adsorption system comprises a sieve, the pressure swing adsorption system being operationally configured to adsorb the at least a portion of the ozone onto the sieve, then to desorb at least a portion of the adsorbed ozone using a sweep gas, the second gas stream comprising the desorbed ozone and the sweep gas.

16. The system of claim 15, wherein the sweep gas comprises at least 90% nitrogen by volume.

17. The system of claim 14, further comprising an aerobic digester and a second interface that is operationally configured to bring the third gas stream into contact with the wastewater either within the aerobic digester or within a second vessel that is in fluid flow communication with the aerobic digester.

18. The system of claim 14, further comprising an output line in fluid flow communication with the pressure swing adsorption system and the ozone generator, the output line being operationally configured to return the third gas stream to the ozone generator.

19. The system of claim 15, further comprising a biogas separator in fluid flow communication with the anaerobic digester, the biogas separator being operationally configured to separate the biogas into a first component stream comprising carbon dioxide and a second component stream comprising methane, and wherein the sweep gas comprises the first component stream.

20. The system of claim 19, further comprising a heat exchanger that is operationally configured to cool the second component stream using liquid nitrogen and a third vessel that is operationally configured to receive nitrogen vapor from the heat exchanger, wherein the sweep gas comprises the nitrogen vapor.

* * * * *